J. F. O'CONNOR.
FRICTION GEAR.
APPLICATION FILED OCT. 18, 1915.
1,223,824.
Patented Apr. 24, 1917.
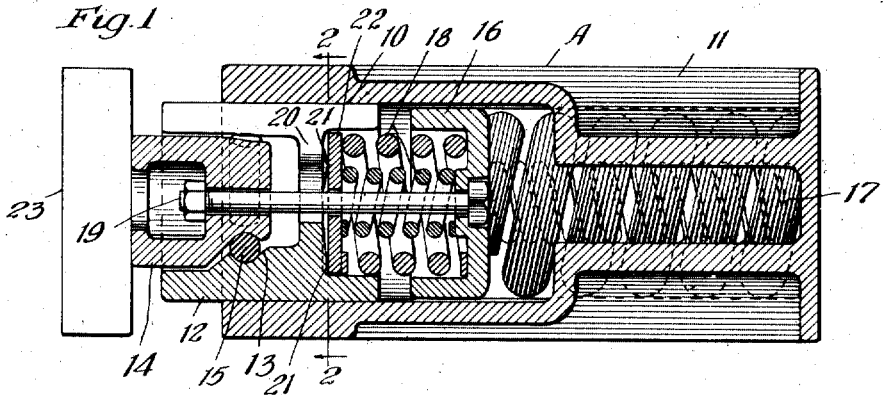
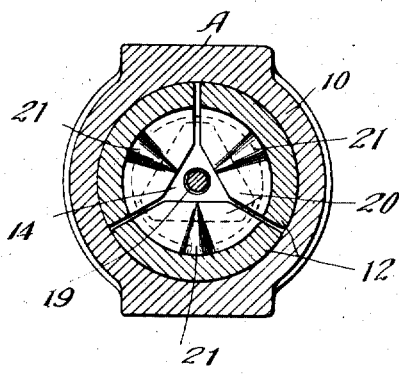
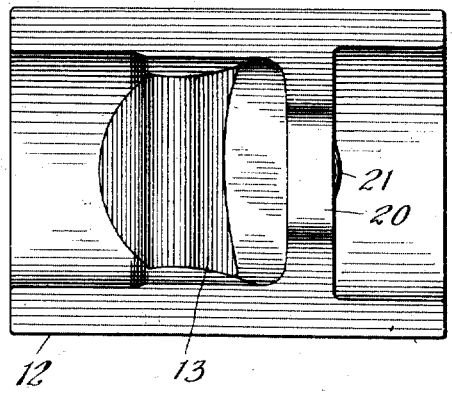
WITNESSES:
Wm. Geiger
INVENTOR.
John F. O'Connor
BY George D. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR.

1,223,824.

Specification of Letters Patent.

Patented Apr. 24, 1917.

Application filed October 18, 1915. Serial No. 56,430.

*To all whom it may concern:*

Be it known that I, JOHN F. O'CONNOR, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears. The object of the invention is to provide cheap, simple, and efficient means for always insuring the maximum effective action of the friction shoes of a friction gear.

In the drawing forming a part of this specification: Figure 1 is a longitudinal sectional view of a draft gear showing my improvements in connection therewith. Fig. 2 is a transverse, vertical sectional view taken on the line 2—2 of Fig. 1, and Fig. 3 is an elevational view upon an enlarged scale, of one of the friction shoes employed with my improvements.

In said drawing, A denotes a casting having a friction shell or cylinder 10 at the forward end thereof and spring casing 11 at the rear, the spring casing being so designed that it will accommodate twin springs, in a well known manner. Coöperating with the shell 10 in the usual manner, are friction shoes 12, three in number, and arranged circularly. Each of the friction shoes 12 is provided with a wedge face 13 on its interior with which coöperates a wedge 14, a plurality of anti-friction rollers 15 being interposed between the wedge and said wedge faces 13 on the shoes. A follower 16 is employed which gears against the front ends of the main springs 17, and between the follower 16 and the shoes 12 is interposed a preliminary spring 18 shown as consisting of two nested coils. A retaining bolt 19 extends through the wedge, between the shoes, through the preliminary spring, and through the follower 16.

All the foregoing parts, so far as described, are or may be of any well known construction.

Due to the fact that the ends of the coils forming the preliminary spring 18 cannot bear on the shoes throughout a complete circle, it is necessary to provide some means which will insure an application of the pressure from the spring to all the shoes and obviate any possibility of one of the shoes not being in contact with or pressed upon by said spring. For this purpose, each of the friction shoes 12 is provided with an inwardly extending flange or shoulder 20 and on the inner side of each flange, that is the side nearest the preliminary spring, said flange 20 is provided centrally thereof with a radially extending rib 21 which rib, in preferable construction, tapers from the outside of the shoe toward the center of the gear. Furthermore, said rib 21 in addition to tapering in the manner above described and as clearly illustrated in Fig. 2, also preferably decreases in height as it approaches the center of the gear. In other words, the rib 21 is preferably in the form of a cone with the apex terminating in the axis of the gear. I also provide a washer 22 between said ribs and the front end of the preliminary spring 18. The result is, that pressure applied to the washer 22 by the spring 18 will necessarily force the washer into contact with the three radially extending ribs 21, since the washer 22 could not rest upon only two of the ribs 21 which are at an angle to each other of approximately only 120°. That is, less than half of a circle. Hence, pressure applied to the wedge 14 from the front follower 23 will be resisted by all three of the friction shoes and possibility of the movement being resisted by two only of said shoes is obviated, since a uniform application of the resistance pressure from the spring is applied to all three shoes and no single shoe can possibly "float" or move idly.

Although I have herein shown and described what I now consider the preferred embodiment of my invention, the same is merely illustrative and I contemplate all changes and modifications as come within the scope of the claims appended hereto.

I claim:

1. In a friction gear, the combination with a plurality of friction shoes circularly arranged, of a washer, said shoes having flanges provided with radially extending ribs thereon against which said washer is adapted to bear.

2. In a friction gear, the combination with a friction shell, a plurality of friction shoes circularly arranged and coöperating with said shell, a wedge coöperating with said shoes, and spring means resisting movement of said shoes relatively to the shell, of means for insuring a uniform application of the spring resistance to movement of all of said shoes, said means including a washer interposed between said spring means and said shoes and uniformly spaced circumferentially arranged projections on said shoes and against which said washer bears.

3. In a friction gear, the combination with a plurality of friction shoes, and spring means for resisting movement thereof, of a washer interposed between said spring means and said shoes, each of said shoes being provided with a radially extending rib tapered toward the center of the gear.

4. As an article of manufacture, a friction shoe for friction gears, said shoe having an outer cylindrical friction face, an inner wedge face, and a flange on its inner face perpendicular to the friction face, said flange being provided on the side remote from the wedge face, with a radially extending rib on which spring pressure is adapted to be applied.

5. A friction shoe for friction gears, said shoe having an outer friction face, an inner wedge face and a flange on its inner face, said flange being provided with a rib on the side away from said wedge face, said rib being tapered toward the free edge of said flange.

In witness that I claim the foregoing I have hereunto subscribed my name this 7th day of October 1915.

JOHN F. O'CONNOR.